UNITED STATES PATENT OFFICE.

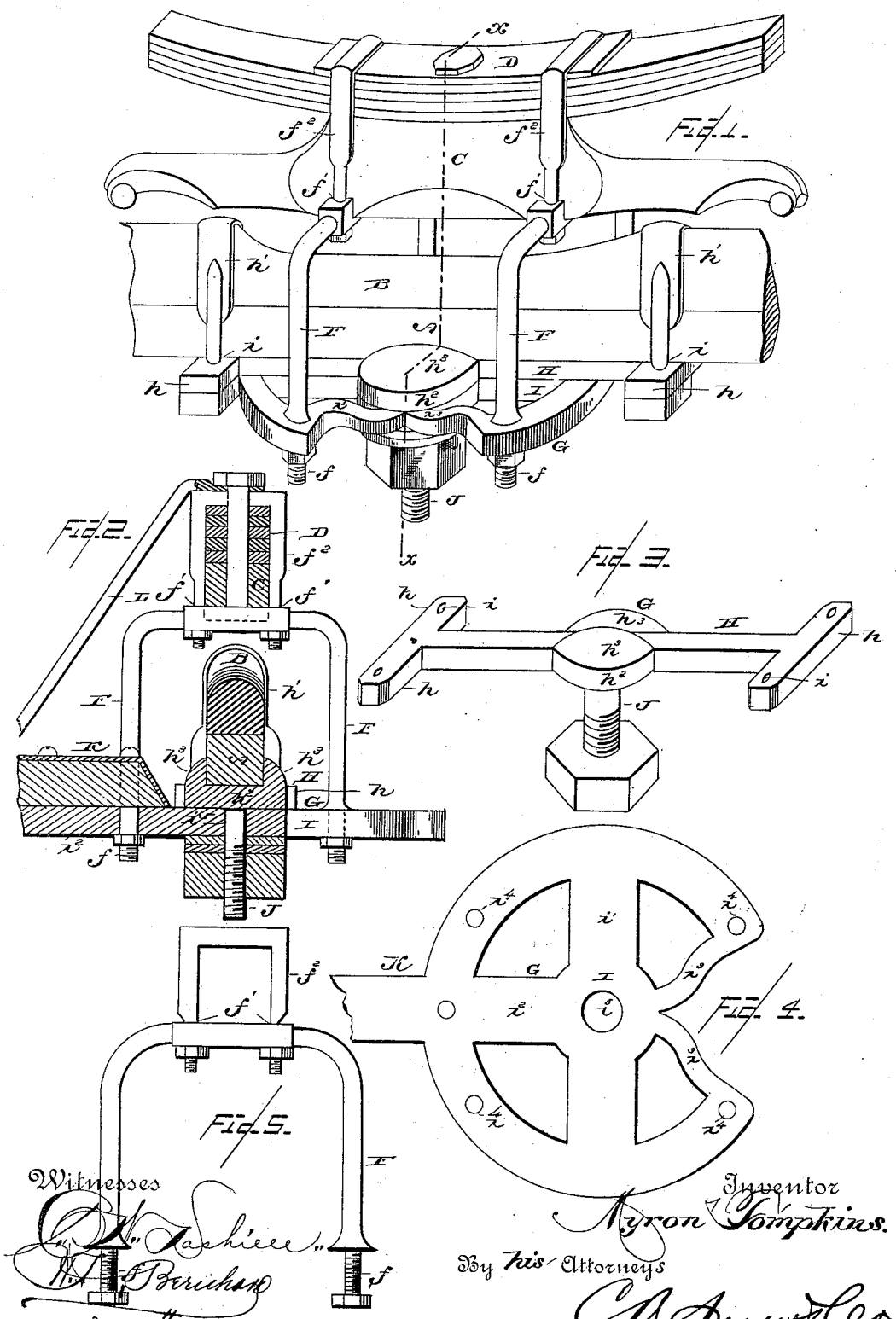

MYRON TOMPKINS, OF ATTICA, OHIO.

FIFTH-WHEEL.

SPECIFICATION forming part of Letters Patent No. 337,460, dated March 9, 1886.

Application filed December 31, 1885. Serial No. 187,197. (No model.)

*To all whom it may concern:*

Be it known that I, MYRON TOMPKINS, a citizen of the United States, residing at Attica, in the county of Seneca and State of Ohio, have invented a new and useful Improvement in Fifth-Wheels, of which the following is a specification, reference being had to the accompanying drawings.

My invention relates to improvements in fifth-wheels; and it consists of the peculiar construction and combination of parts, substantially as hereinafter fully set forth, and specifically pointed out in the claims.

Heretofore in this class of devices the members of the fifth-wheels have been generally bolted or otherwise suitably mounted on the upper face of the axle and its bed, the lower member of the wheel being rigidly connected to the axle, and the upper member of said wheel connected to the lower member so as to rotate freely thereon and carrying the bolster and springs for the front part of the vehicle-body. The devices of this class are objectionable, from the fact that the strain and wear are brought upon the axle directly, and the parts require frequent repairs and renewals to adapt them for use, which is quite expensive.

In my improved fifth-wheel I locate and support the fifth-wheel members beneath the axle and its bed, and suspend the head-block and spring of the vehicle-body above the axle and bed and out of contact therewith, the head-block and spring being supported on the lower member of the fifth wheel, to bring the strain, draft, and wear on the king-bolt and upper and lower members of the fifth-wheel. The means by which I attain these results are very simple, strong, and durable in their construction, thoroughly effective in operation, and cheaper than the ordinary fifth-wheel at present in use.

In the accompanying drawings, Figure 1 is a perspective view of a fifth-wheel constructed in accordance with my invention. Fig. 2 is a central vertical longitudinal sectional view on the line $x\ x$ of Fig. 1. Figs. 3 and 4 are detail detached views of the upper and lower members of the fifth-wheel, and Fig. 5 is a detail view of one of the head-block supporting-yokes.

Referring to the drawings, in which like letters of reference indicate corresponding parts in all the figures, A designates an axle; B, the bed thereof; C, a head-block located above and out of contact with the axle-bed; D, the spring connected to the head-block; F, the supporting-yokes connected to the head-block and straddling the axle; G, the fifth-wheel, and K the reach, the peculiar construction and arrangement of the several parts above mentioned being fully described hereinafter.

The axle and its bed and the head-block and spring may be of the form shown in the accompanying drawings; or any preferred devices of like character may be substituted for all or either of them.

Each one of the supporting-yokes F (shown in detail in Fig. 4) has reduced threaded ends $f$, and at its upper rounded portion is made oblong or square in shape, so that the head-block C may rest firmly thereon. The yokes may have upturned ledges or flanges, that are adapted to bear on opposite faces of the head-block, and the squared portion of the yokes have openings $f'$, through which are passed the lower threaded ends of clips $f^2$, that serve to secure the spring D to the head-block, the lower threaded ends of said clips receiving nuts to rigidly secure the spring to the head-block. Two yokes are provided to suspend and support the head-block and spring above the axle and its bed and out of contact with the same, and these yokes are disposed so that they straddle the axle and bed thereof, and at opposite ends of the head-block. The lower reduced ends, $f$, of the yokes are passed through openings $i^4$ in the lower member of the fifth-wheel, and the yokes are rigidly connected with the said lower member of the fifth-wheel by fastening-nuts, as shown.

The fifth-wheel G comprises two members, H I, which are pivotally connected together by a king-bolt, J, to permit of the movement of said fifth-wheel members when the vehicle turns a curve, &c. The upper member, H, of the fifth-wheel is shown in detail in Fig. 3, and comprises a straight bar of metal of a width equal to that of the axle A, against the lower or under face of which it bears. The ends of said upper member are provided with right-angled lugs or clip-bars $h$, which extend on opposite sides of the axle at each end of the upper member, and each of the lugs or clip-bars is provided with an opening, through which passes the lower threaded end of one of the arms of a clip, $h'$. Two of these clips $h'$ are provided, one for each end of the upper member, and these clips serve to rigidly secure the axle, its bed, and the upper member of the fifth-wheel together, so that the upper member of the wheel moves in unison with the axle. At or near its middle the bar-shaped upper member of the fifth-wheel has an enlarged portion, $h^2$, which projects beyond the axle on opposite sides thereof, and this enlarged portion has upwardly-projecting lugs, $h^3$, that bear against opposite faces of the axle which is seated therein, to firmly connect the parts together and relieve the clips $h'$ at the ends of the upper member from a portion of the strain and draft. The king-bolt J is rigidly secured or connected to the enlarged middle portion, $h^2$, of the upper member of the fifth-wheel by welding or otherwise, and the lower end of the king-bolt is threaded, so that an intermediate plane or smooth portion is provided between the lower face of the upper member of the fifth-wheel and the threaded portion of the king-bolt, the lower member, I, being fitted so as to rotate in horizontal planes on the smooth portion of the king-bolt, as is obvious. The lower member, I, of the fifth-wheel, which is shown in detail in Fig. 4, is made similar to an open ring, and it is strengthened and braced by an arm, $i'$, another arm, $i^2$, connected to the middle of the arm $i'$, and arms, $i^3$, that extend from the middle portion of the brace-arm $i'$ to the outer free ends of the open ring-like member of the fifth-wheel, all of said arms being formed integral or in one piece of metal; but I do not desire to confine myself to the precise form of the lower member of the fifth-wheel shown and described. The lower ring-link member of the wheel has four openings, $i^4$, two of which are provided for each of the supporting-yokes F, and the brace-arm $i'$ has an opening, $i^5$, therein, through which passes the lower threaded end of the king-bolt J. The arm $i^2$ of the lower fifth-wheel member is extended rearwardly, and the front end of the reach or perch K is connected thereto by bolts, as shown. A nut is screwed on the lower threaded end of the king-bolt, to pivotally connect the upper and lower members of the fifth-wheel together, and a metallic and a yielding washer are fitted on the king-bolt between the nut and the fifth-wheel.

L designates a vertically-disposed brace that is rigidly bolted at its lower end to the reach, and is pivotally connected at its upper end to the spring D or head-block C by a bolt and nut.

From the foregoing description, taken in connection with the drawings, it will be seen that the head-block and spring are suspended above the axle and its bed, out of engagement and contact with the same, and that the weight thereof is brought on the lower member of the fifth-wheel. The axle is thus relieved of the direct weight of the head-block, spring, and vehicle-body, and the weight of these parts is suspended from the under side of the axle. The fifth-wheel is located below and supported by the axle, and the yokes are of such proportion and size that the requisite movements of the axle is permitted without interference or hinderance from the yokes. The axle and upper member of the fifth-wheel rotate or turn together on the lower member thereof, and said lower member receives the direct weight of the head-block, its spring, and the vehicle-body, which weight serves to force the lower member away from the upper member, and thus reduces the friction and wear between the members of the fifth-wheel. The reach or perch being connected to the lower fifth-wheel member, the draft is thus brought thereon and on the king-bolt, which transmits it to the upper member, and thence to the axle, so that the draft is distributed through all the parts.

I do not desire to confine myself to the precise construction herein shown and described, as I am aware that many changes therein may be made without departing from the principle of my invention.

Having thus described my invention, what I claim as new, and desire to secure by Letters Patent, is—

1. The combination of an axle, a fifth-wheel arranged below the axle, a head-block located above and out of contact with the axle, and yokes rigidly connected to the head-block and the fifth-wheel, substantially as described.

2. The combination of an axle, a fifth-wheel, a head-block, and yokes that straddle the axle, and are rigidly connected to the fifth-wheel and the head-block, to support the latter out of engagement with the axle, substantially as described.

3. The combination of an axle and a fifth-wheel located below the axle, and comprising an upper member bolted to the axle, a lower member for supporting a head-block, and a king-bolt to pivotally connect the upper and lower members, substantially as described.

4. The combination of an axle, a fifth-wheel located beneath and supported by the axle, a head-block, and yokes straddling the axle and rigidly secured to the lower member of the fifth-wheel, substantially as described.

5. The combination of an axle, a fifth-wheel located beneath the axle, a head-block, yokes connecting the head-block and lower member of the fifth-wheel, and a reach, also connected with the lower fifth-wheel member, substantially as described.

6. The combination of an axle, an upper fifth-wheel member having a seat for the axle and rigidly connected thereto, a king-bolt rigidly secured to the upper member, and a lower member loosely mounted on the king-bolt, substantially as described.

7. The combination of an axle, an upper fifth-wheel member rigidly connected thereto, a lower member, a king-bolt, yokes secured to the lower member, a head-block rigidly connected to the yokes, and a reach connected to the lower member, the whole arranged and adapted to serve substantially as described, for the purpose set forth.

In testimony that I claim the foregoing as my own I have hereto affixed my signature in presence of three witnesses.

MYRON TOMPKINS.

Witnesses:
E. G. SIGGERS,
H. T. BERNHARD,
WM. N. MOORE.